April 7, 1936.  J. SALSBURG  2,036,544
SEED FEEDING MEANS FOR PLANTERS
Filed May 1, 1935
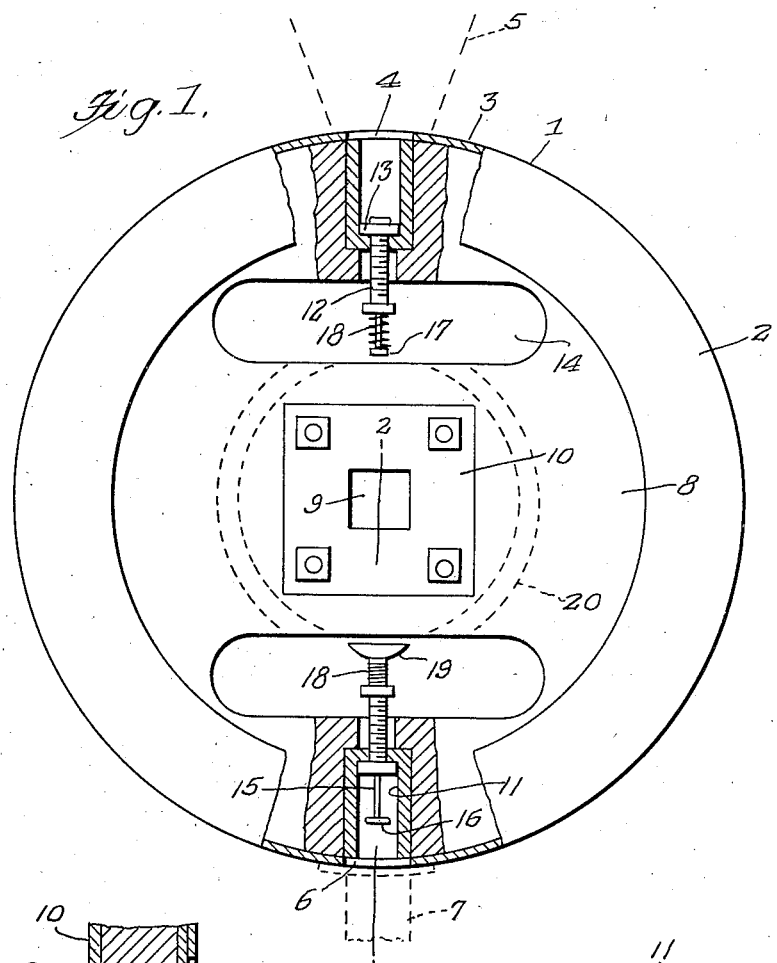
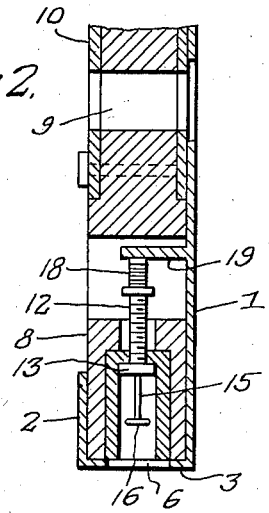
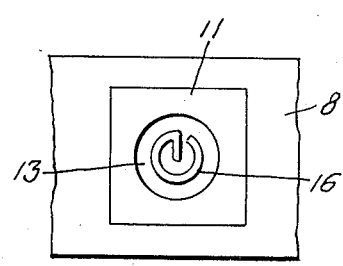
Inventor
Jacob Salsburg,
By Clarence A. O'Brien
Attorney Patented Apr. 7, 1936

2,036,544

UNITED STATES PATENT OFFICE 2,036,544

SEED FEEDING MEANS FOR PLANTERS

Jacob Salsburg, Wilkes-Barre, Pa.

Application May 1, 1935, Serial No. 19,309

2 Claims. (Cl. 221—125)

This invention relates to seed feeding means for planters of various kinds. For instance this means may be used in place of the feeding wheel forming part of my Patent No. 1,919,397 dated July 25, 1933. The general object of this invention is to provide a disk having cylinders therein for receiving seed from a hopper and discharging the seed through a delivery chute, during rotary movement of the disk, with means for adjusting the capacity of the cylinder to regulate the amount of seed delivered by each cylinder into the chute.

Another object of the invention is to provide means for forcing the seed from a cylinder, as the cylinder reaches discharging position, so as to prevent clogging or jamming of the seeds in the cylinder.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is an elevation with parts broken away and looking into the open side of the casing which contains the feeding disk.

Figure 2 is a section on the line 2—2 of Figure 1.

Figure 3 is a fragmentary view of the disk and looking into a cylinder.

In this drawing the numeral 1 indicates a casing which has one closed side and the other side of which is open, excepting an annular flange 2 which extends inwardly from the rim 3 of the casing, it being seen that the casing is of circular shape. The casing is provided with a hole 4 at the top part of its rim which opens out into a hopper 5 shown in dotted lines in Figure 1 and the lower part of the rim is formed with a discharge opening 6 which discharges into a chute 7 or the like which is shown in dotted lines in Figure 1. A disk 8 is rotatably arranged in the casing and has the centrally arranged opening 9 therein which is preferably of rectangular shape in cross section for receiving a square part of a drive shaft by which the disk is rotated. Reinforcing plates 10 are countersunk in the sides of the disk and have openings therein registering with the opening 9.

A plurality of cylinders 11 are inserted in the holes in the disk which open out through the periphery thereof and while the drawing shows two of these cylinders, oppositely arranged, it will be understood that any desired number of cylinders can be used and if desired one cylinder can be used. Each cylinder has a threaded hole in its inner closed end through which passes a threaded shaft 12 which has a piston 13 on its outer end and has a sliding fit in the cylinder. The heads at the inner ends of these shafts 12 extend into the elongated openings 14 in the disk and which are disclosed by the open side of the casing. Thus the bolts can be turned by projecting the fingers into the openings 14 and grasping and turning the shafts which will project or retract the pistons in the cylinders and thus regulate the capacity of each cylinder so as to regulate the amount of seed dropping from the hopper into the cylinder.

Each shaft 12 has a longitudinally extending bore therein through which passes a pin 15 which has its outer end coiled as shown at 16 and its inner end has a head 17 thereon. A spring 18 encircles the inner part of the pin and bears against the head of the shaft and the head 17 of the pin and tends to hold the coil 16 against the piston. A projection 19 extends inwardly from the closed side of the casing and has its underface arcuate shaped, as shown in Figure 1. This projection 19 is located above the lower opening 6 of the casing and the disk 8 is formed with an annular groove 20 in that face adjacent the closed side of the casing for receiving the projection during the rotary movement of the disk.

Thus as that part of the disk containing a cylinder moves downwardly the head 17 of the pin 15 will engage the projection 19 and the rounded lower face of the projection will project the pin in the position shown in Figures 1 and 2 and thus the coil 16 will act to force seeds which have become jammed in the cylinder from the cylinder into the chute 7. As soon as the head 17 of the pin passes by the projection 19 the spring 18 will move the pin inwardly so that the coil 16 will engage the piston 13.

As it will be seen when a cylinder comes under the hopper some of the seed in the hopper will drop into the cylinder the amount of seed dropping into the cylinder can be regulated by adjusting the piston 13 in the cylinder. Then during rotary movement of the disk the cylinder containing the seeds would come into register with the discharge opening 6 so that the seed will drop from the cylinder into the delivery chute 7 and at the same time the pin will be projected to dislodge any seed that may be caught in the cylinder.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. Seeding means for a planter comprising a vertically arranged circular casing having an inlet hole in the top part of its rim and an outlet hole at the bottom part of the rim, a disk rotatably arranged in the casing and having a pocket therein opening out through a portion of the periphery for receiving seeds from the inlet hole and discharging the seeds through the outlet hole, a piston in the pocket, a threaded tubular shaft passing through the inner end of the pocket, means whereby the shaft can be turned to project and retract the piston, a pin passing through the shaft and the piston and having a head at its outer end, a spring connected with the pin for holding its head against the piston and means carried by the casing for projecting the pin when the pocket is in register with the outlet hole of the casing.

2. Seeding means of the class described comprising a vertically arranged circular casing having a seed inlet at the top of its rim and a seed discharge at the bottom of its rim, one side of the casing having an enlarged opening therein, a disk rotatably arranged in the casing, a cylinder carried by the disk and opening through the periphery thereof, a piston in the cylinder, a screw shaft passing through a threaded hole in the inner end of the cylinder and connected with the piston and having a head at its inner end, said disk having an enlarged opening therein into which the headed end of the screw shaft projects, a pin passing through the shaft and having a head at each end thereof, a spring for holding the head at the outer end of the pin against the piston and a cam carried by the casing and engaging with the head at the inner end of the pin when the piston and cylinder are in position over the discharge opening of the casing for projecting the pin to dislodge seeds from the cylinder.

JACOB SALSBURG.